(12) United States Patent
Pavlopoulou (10) Patent No.: US 9,201,857 B2
(45) Date of Patent: Dec. 1, 2015

(54) FINDING MULTIPLE FIELD GROUPINGS IN SEMI-STRUCTURED DOCUMENTS

(71) Applicant: Palo Alto Research Center Incorporated, Palo Alto, CA (US)

(72) Inventor: Christina Pavlopoulou, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 111 days.

(21) Appl. No.: 13/799,289

(22) Filed: Mar. 13, 2013

(65) Prior Publication Data

US 2014/0281938 A1    Sep. 18, 2014

(51) Int. Cl.
*G06F 17/30* (2006.01)
*G06F 17/24* (2006.01)

(52) U.S. Cl.
CPC ................ *G06F 17/243* (2013.01)

(58) Field of Classification Search
CPC ................ G06F 17/30321; G06F 17/30613
See application file for complete search history.

(56) References Cited

U.S. PATENT DOCUMENTS

| | | | | |
|---|---|---|---|---|
| 8,203,765 | B2* | 6/2012 | Pandipati | 358/474 |
| 8,625,895 | B2* | 1/2014 | Ma | 382/173 |
| 2006/0088214 | A1* | 4/2006 | Handley et al. | 382/176 |
| 2009/0119574 | A1* | 5/2009 | Gitlin et al. | 715/209 |
| 2012/0201457 | A1* | 8/2012 | Bart et al. | 382/176 |
| 2012/0330971 | A1* | 12/2012 | Thomas et al. | 707/748 |

\* cited by examiner

*Primary Examiner* — Hosain Alam
*Assistant Examiner* — Robert F May
(74) *Attorney, Agent, or Firm* — Fay Sharpe LLP (57) ABSTRACT

A method is provided for parsing a semi-structured document having a plurality of document lines on which a series of items are listed, the listing of each item spanning one or more document lines. The method includes: obtaining a plurality of candidate records, each candidate record spanning one or more lines of the document; defining a term representing an optimal cost of selecting a number n of candidate records to span the document lines up to a given ending document line i; efficiently evaluating the term over a first range of values for n and a second range of values for i; and selecting a subset of the plurality of candidate records as a global optimal parse of the document, wherein the subset selected is based on the evaluation of the defined term.

12 Claims, 6 Drawing Sheets

| | 12 | 14 | 16 |
|---|---|---|---|
| 1 | 1987 | BASEBALL | $1.00 |
| 2 | 3704 | BAT | $6.00 |
| 3 | 7363 | T-SHIRT, RED | $5.00 |
| 4 | | SIZE M | |
| 5 | 8007 | HAT | $8.50 |
| 6 | 3909 | GOLF SHOES, | $2.57 |
| 7 | | BRAND X | |
| ⋮ | ⋮ | ⋮ | ⋮ |
| L | 1234 | FOOTBALL | $4.00 |

| | | | | |
|---|---|---|---|---|
| 1 | 1987 | BASEBALL | $1.00 | —22 |
| 2 | 3704 | BAT | $6.00 | —22 |
| 3 | 7363 | T-SHIRT, RED | $5.00 | |
| 4 | | SIZE   M | | —22 |
| 5 | 8007 | HAT | $8.50 | —22 |
| 6 | 3909 | GOLF SHOES, | $2.57 | |
| 7 | | BRAND   X | | —22 |
| ⋮ | ⋮ | ⋮ | ⋮ | |
| L | 1234 | FOOTBALL | $4.00 | —22 |

FINDING MULTIPLE FIELD GROUPINGS IN SEMI-STRUCTURED DOCUMENTS

BACKGROUND

The present inventive subject matter relates generally to the art of automated document processing. Particular but not exclusive relevance is found in connection with parsing of semi-structured documents, e.g., such as sales receipts, invoices, tables, lists, etc. The present specification accordingly makes specific reference thereto at times. However, it is to be appreciated that aspects of the present inventive subject matter are also equally amenable to other like applications.

It has been found beneficial in some cases to parse a semi-structured document into simple, salient tokens of information, referred to as "fields". For example, typical fields found on a receipt can include item numbers, item descriptions and prices for a series of purchased items reflected on the receipt. Parsing semi-structured documents into fields can be a challenging problem, e.g., because of high variability in the layout of different documents and because of strong and/or complex interactions among fields. Commonly, fields may interact in pairs, e.g., where the end of one field determines the beginning of another. Fields may also commonly interact in groups. That is to say, a semi-structured document may include an array of records having a similar layout style, where each record consists of a group of fields. For example, in the case of a sales receipt or the like, each sale item on the receipt may correspond to one record which includes a group of fields, e.g., such an item number, an item description, a price, etc. Because of these characteristics, an optimization of relevant criteria has traditionally involved searching for a best or optimal parsing solution over an entire space or vast number of hypothetical parsing solutions. Such an operation can be a prohibitive task for long, multi-page documents.

Currently, many individuals and/or businesses may perform the aforementioned parsing task manually. This can lead to significant costs of document processing. For example, it has been estimated that the cost of processing a single invoice is not insignificant. In some cases, large businesses may process tens of thousands of invoices per day, which can result in disadvantageously high operating costs. Accordingly, some may find it desirable to reduce the manual effort involved in parsing semi-structured documents.

Some automatic approaches have been proposed and/or developed to address semi-structured document parsing. In accordance with some of these approaches, candidate fields are first identified either one-by-one or by segmentation of an entire document and subsequently assign a type (or functional role) to them. Some such approaches make local decisions and often perform poorly in cases where ambiguities exist regarding the type assignment. When ignoring the interactions among fields, they can be susceptible to the significant variations in the layout of different document. Moreover, some may not recover from errors in candidate field identification. Finally, some previous approaches are restricted to single-page documents and, thus, cannot handle cases, e.g., where a table, or invoice, is divided into more than one page.

Accordingly, a new and/or improved method and/or system or apparatus for parsing semi-structured documents is disclosed which addresses the above-referenced problem(s) and/or others.

INCORPORATION BY REFERENCE

U.S. patent application Ser. No. 13/022,877, filed Feb. 8, 2011, by Bart, et al. (hereinafter simply referred to as "Bart"); and U.S. patent application Ser. No. 13/799,568 for "Efficient Globally Optimal Interpretation of Documents," filed even date herewith, by Pavlopoulou, et al. (hereinafter simply referred to as "Pavlopoulou") are both hereby incorporated herein by reference in their entirety.

SUMMARY

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the invention to the precise forms disclosed in the following detailed description. Rather, the embodiments are chosen and described so that others skilled in the art may appreciate and understand the principles and practices of the present inventive subject matter.

In accordance with one embodiment, a method is provided for parsing a semi-structured document having a plurality of document lines on which a series of items are listed, the listing of each item spanning one or more document lines. The method includes: obtaining a plurality of candidate records, each candidate record spanning one or more lines of the document; defining a term representing an optimal cost of selecting a number n of candidate records to span the document lines up to a given ending document line i; efficiently evaluating the term over a first range of values for n and a second range of values for i; and selecting a subset of the plurality of candidate records as a global optimal parse of the document, wherein the subset selected is based on the evaluation of the term.

In accordance with another embodiment, a system is provided including a data processor operative to execute the foregoing method.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and other embodiments, are given by way of illustration and not limitation. Many changes and modifications within the scope of the present invention may be made without departing from the spirit thereof, and the invention includes all such modifications.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards, algorithms and/or protocols, and other components, algorithms, methods and/or processes that are commonly known in the art without further detailed explanation as to their configuration or operation except to the extent they have been modified or altered in accordance with and/or to accommodate the preferred embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

In general, there is disclosed herein an algorithm, method and/or system which is operative to optimally parse and/or otherwise process a semi-structured document (e.g., such as a receipt, invoice, table, list, etc.) into a sequence of field groupings or records. Suitably, an efficient dynamic programming method is employed to execute the parsing. In practice, each grouping may correspond to a transaction record or the like. For example, in the case of receipts, such a record may include fields such as: an item number field, an item description field and a price field. Notably, the method scales well with respect to the length of the document and is suitable for multi-page documents.

Figure 1:
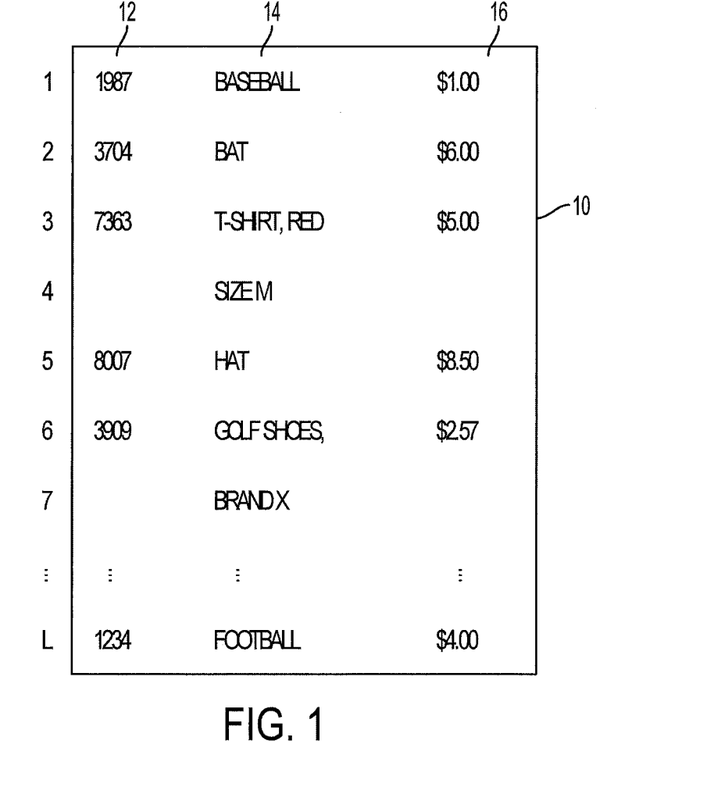
FIG. 1 is a diagrammatic illustration showing an exemplary semi-structured document suitable for processing in accordance with aspects of the present inventive subject matter.

FIG. 1 shows a so-called semi-structured document 10 suitable for parsing and/or processing in accordance with the presently disclosed inventive subject matter. As in the illustrated example, the document 10 includes an array or sequential series of well-defined horizontal lines of text (i.e., text lines or document lines). In particular, for this example, the document 10 includes within the lines thereof a list of a number of items, e.g., as a sales receipt might. Each listed item has a corresponding item number 12, item description 14 and item price 16. Accordingly, an ideal or optimal parse of the document 10 places each individual item in a separate record including a grouping of fields, in this case namely three fields—an item number field, an item description field and an item price field. For the sake of reference herein, the various lines of text of the document 10 have been consecutively numbered, i.e., 1 through L. It is to be appreciated however that in practice the actual document 10 may not include such numbering.

As can be appreciated and as illustrated in the present example, in some cases, the listing of and/or corresponding text for an item on the document 10 may span only one line of document, e.g., as is the case for the first, second and fourth items in this example (i.e., the baseball, bat and hat) spanning document lines 1, 2 and 5, respectively. In other cases, the listing of and/or corresponding text for an item on the document 10 may span multiple lines of the document, e.g., as is the case for the third and fifth items in this example (i.e., the t-shirt and golf shoes) spanning lines 3 and 4 and lines 6 and 7, respectively. Of course, in practice, the document may include other layouts and/or fields; the various different items included on the document may variably span any of one or more lines of the document; and the document may include multiple pages on which the items are listed.

Figure 2:
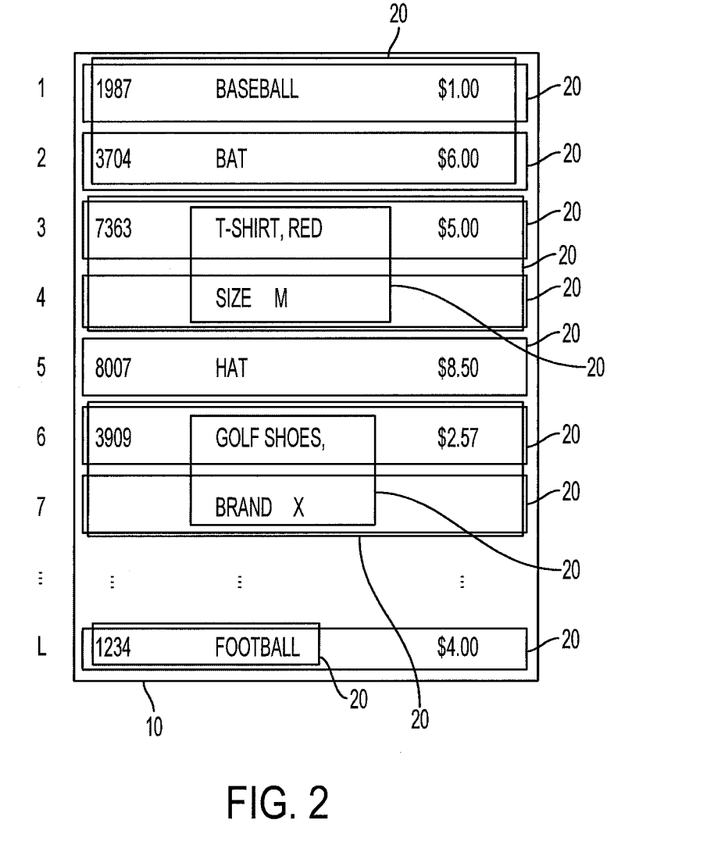
FIG. 2 is a diagrammatic illustration showing an exemplary set of candidate records obtained for the document of FIG. 1 in accordance with aspect of the present inventive subject matter.

FIG. 2 shows a set of candidate field groupings or candidate records 20 obtained for the document 10. In practice, the candidate records 20 may be determined, computed, identified and/or otherwise obtained, e.g., via a best-first leaf search (BFLS) and/or other algorithms as taught in Bart or via another suitable algorithm or using A* and/or Gibbs sampling, etc. In any event, as illustrated in the present example, each candidate record 20 in the set thereof is identified by a box surrounding the respective fields and/or tokens (i.e., the respective values of the fields or in this case the various text) which are included in a given candidate record 20. The total set of candidate records 20 represents all or some filtered set of the hypothetical records which may be produced by a suitable parse of the document 10. In practice, the final solution or optimal parse generally includes a selected subset of the candidate records 20 which most closely reflects the actual document.

Note, for the sake of simplicity and/or clarity herein, FIG. 2 shows a particular set of candidate records 20 for the document 10. In practice however, it is to be appreciated that other candidate records not shown may also be obtained and/or included in the set thereof. In any event, from the illustrated example, it can be seen that there exists some ambiguity regarding the specific record into which particular tokens and/or lines of text should be placed in accordance with a parse of the document 10. Notably, under an applicable constrain applied in accordance with aspects of the present subject matter, at most one candidate grouping and/or candidate record 20 is selected per row or line of the document 10. In other words, in the output parse which is deemed optimal in accordance with a suitable embodiment described herein, a given token or field or document line can belong to no more than one record or grouping of fields/tokens at a time. However, commonly, an obtained set of candidate records, e.g., such as the set of candidate records 20 illustrated in FIG. 2, may have some fields or tokens which belong to or are encompassed by multiple candidate records. That is to say, as shown in FIG. 2, some of the candidate records 20 overlap one another.

To illustrate further, consider the tokens/text or fields on lines 4 and 7 of the document 10. The ambiguity to be resolved, as it were, involves selecting the appropriate parse which correctly places the token/text or field with its corresponding item. For example, in one case or another, a hypothetical solution or parse may include a selected subset of candidate records 20 in which the token/text or field on line 4 of the document 10 is: (i) included in a record with the tokens/text and/or fields on line 3 of the document 10; (ii)

included in a separate record of its own; or (iii) included in a record (not shown) with the tokens/text and/or fields on line 5 of the document 10. Similarly, for the token/text or field on line 7 of the document 10, a hypothetical solution or parse may include a selected subset of candidate records 20 in which the token/text or field on line 7 of the document 10 is: (i) included in a record with the tokens/text and/or fields on line 6 of the document 10; or (ii) included in a separate record of its own.

Of course, as the token/text on line 4 of the document 10 in fact is part of the preceding item (i.e., it is an extension of the item description 14 beginning on line 3 of the document 10) and the token/text on line 7 of the document 10 in fact is part its preceding item (i.e., it is an extension of the item description 14 beginning on line 6 of the document 10), the final solution and/or optimal parse of the document 10 is suitably the one that places the token/text on line 4 of the document 10 in the same record with the token/text on line 3 of the document 10; and places the token/text on line 7 of the document 10 in the same record with the token/text on line 6 of the document 10.

In accordance with one suitable embodiment, the obtained candidate records 20 are also accompanied by associated labeling scores or cost. Labeling as used herein refers to the grouping or including of one or more document lines in the same candidate record. The labeling score or cost is denoted herein as S(i,j). In general, the labeling score reflects a cost of labeling the text lines i through j of the document 10 with candidate record 20, i.e., the cost of placing the document's lines i through j within selected candidate record 20. For example, the labeling cost or scores S(i,j) associated with the set of candidate record 20 may be obtained or determined as taught by Pavlopoulou or via other suitable algorithms. In practice, the total cost of a selected subset of candidate groupings or records 20 for any particular hypothetical parse may be given by a summation of the costs of each of the candidate groupings or records 20 in the selected subset.

Figure 3:
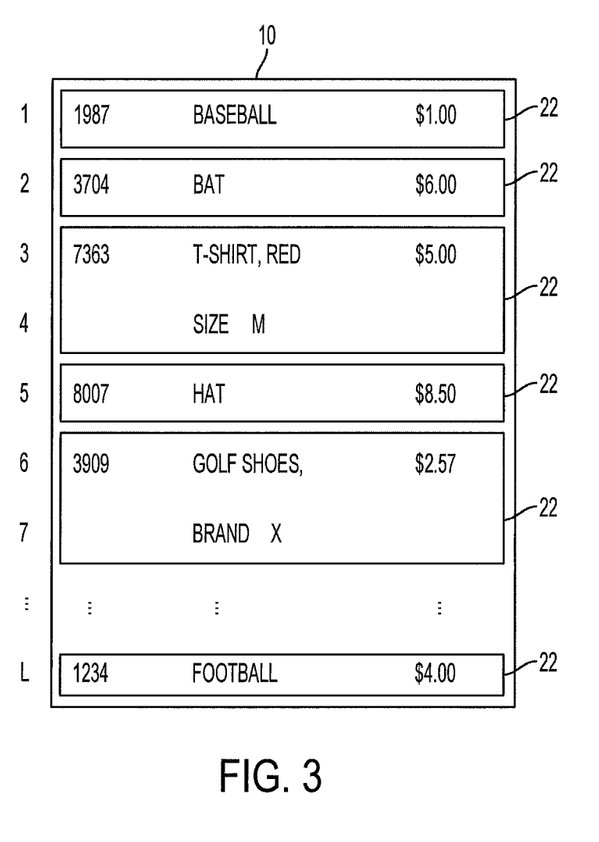
FIG. 3 is a diagrammatic illustration showing an exemplary final solution and/or optimal parse obtained for the document of FIG. 1 in accordance with aspect of the present inventive subject matter.

In accordance with one suitable embodiment, a method and/or algorithm (e.g., executed by a suitable processor or the like) is provided which takes as its input a set of candidate records (e.g., such as those candidate records 20 shown in FIG. 2), along with the associated labeling scores therefor and outputs based thereon an "optimal" parse or final solution which includes a best, non-overlapping (as per the above-mentioned constrain) selection of the candidate groupings or records 20. For example, FIG. 3 shows an exemplary resulting output for the document 10 including records 22 selected from the candidate records 20 shown in FIG. 2. Suitably, dynamic programming is employed to compute or otherwise determined the optimal parse based on the set candidate records 20 and the associated labeling scores. In one suitable embodiment, to set up the dynamic programming, $T_n(i)$ is defined as an optimal cost of selecting a number n of groupings or records 20 up to the i-th document line. In practice, $T_n(i)$ may be computed recursively as:

$$T_n(i) = \min_{j<i}(T_{n-1}(j) + S(j,i)) \text{ for all } i \leq L \quad (1)$$

where L is the number of lines in the document 10. Accordingly, the total or global optimal cost for the document 10 is given as the $\min_n T_n(L)$. To aid in efficient tracing of the optimal solution upon termination of the procedure, suitably, for every $T_n(i)$, a pointer or the like is stored or saved and/or otherwise set to reference and/or identify the document line j where the previous grouping or record ends.

Figure 4:
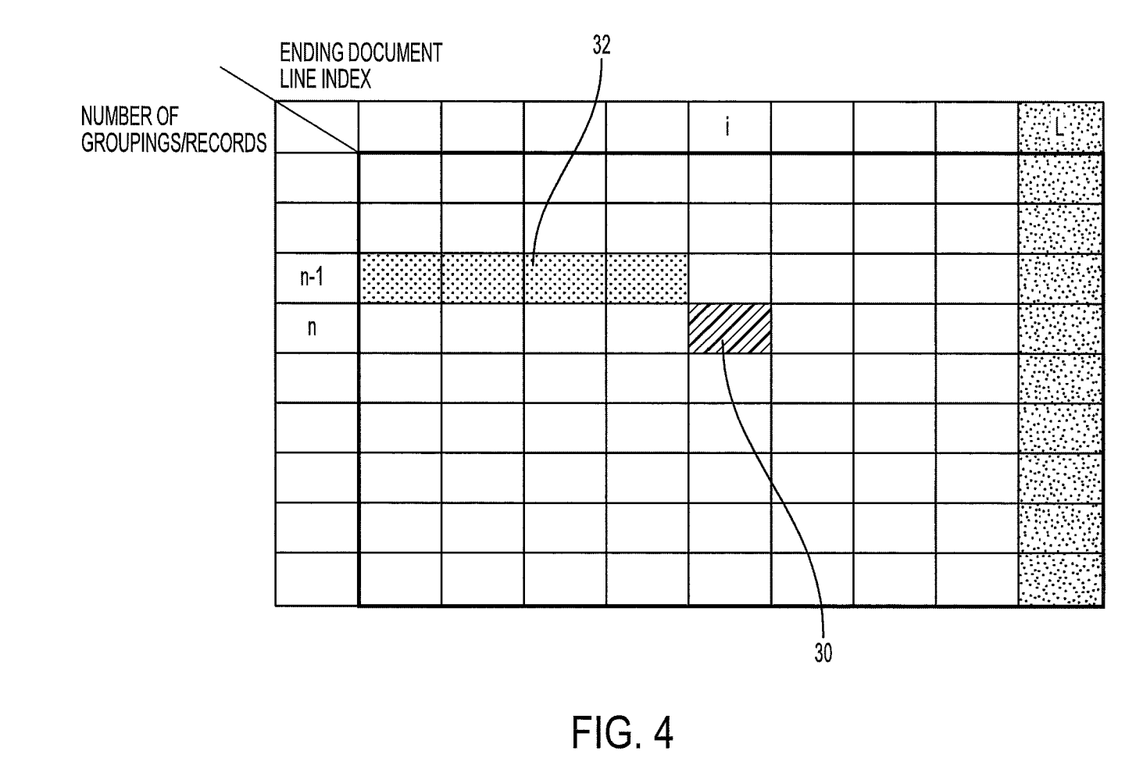
FIG. 4 illustrates an exemplary matrix suitable for use in executing an optimal parse of a semi-structured document in accordance with aspect of the present inventive subject matter.

In one exemplary embodiment, the parsing algorithm may be implemented with the aid of a matrix, e.g., such as the one shown in FIG. 4. In the illustrated matrix, each row corresponds to a particular index n which indicates the respective number of candidate groupings or records that may be selected in a hypothetical parse, and each column corresponds to a particular index i which indicates the possible ending rows or document lines which are covered by the n selected records. Accordingly, each row n of the matrix contains the best costs of selecting n candidate records (i.e., depending on the ending document line covered by the selected n candidate records), and each column i of the matrix contains the best costs of labeling all the document lines up to and including the document line i with one or more candidate records (i.e., depending on the number n of records selected). In other words, a matrix entry (n, i) contains the cost of covering all the document lines up to and including document line i with n records.

More specifically, the matrix is suitably established and/or generated by computing or otherwise determining and/or entering the respective values of $T_n(i)$ in the corresponding matrix entries. Suitably, the matrix entries are filled in row-wise fashion. In practice, to compute or determine the cost or value for a matrix entry or element (n, i) (e.g., indicated by the crosshatched matrix entry 30), the algorithm or method computes or takes a minimum over those entries in the previous matrix row having an ending document line index less than i (e.g., those entries indicated by the hatched matrix entries 32). That is to say, a matrix entry (n, i) is suitably calculated or otherwise determined by taking the minimum cost or value of the matrix entries (n−1, j) for all j<i. Suitably, the last column (L) contains the best possible costs of covering the document 10 with n records. Hence, the global minimum is the minimum of the values or costs in the last column (L).

Returning attention now to FIG. 3, there is shown an exemplary output of the algorithm and/or document parsing method disclosed herein, i.e., a final solution and/or global optimal parse in accordance with aspect of the present inventive subject matter. In particular, the exemplary final solution or parse depicted in FIG. 3 is for the document 10 depicted in FIG. 1 having candidate records 20 obtained therefor, e.g., as shown in FIG. 2. More specifically, the boxes 22 in FIG. 3 denote a parse structure and/or a covering reflecting the selected subset of candidate records 20 as determined by the algorithm and/or automatic parsing described herein. In practice, the covering or parse structure may be graphically depicted in, represented or otherwise superimposed over the document 10 or an image or replication of the document 10, e.g., either in hardcopy or electronic or some other representative format. Note that the illustrated representation of the parse and/or resulting covering is used here for readability. In other cases, the covering and/or parse structure may be represented and/or used in any of one or more ways depending on a specific embodiment or desired application, e.g., in one or more electronic data formats suitable for storing in a file or a database, exchanging over a network, and the like. Suitably, the text/tokens or other information or data included in the given records 22 may be extracted and/or provided with a meaningful label or semantic role or some other indicator or tag identifying the same, e.g., for use and/or storage in a database or spreadsheet or the like.

Figure 5:
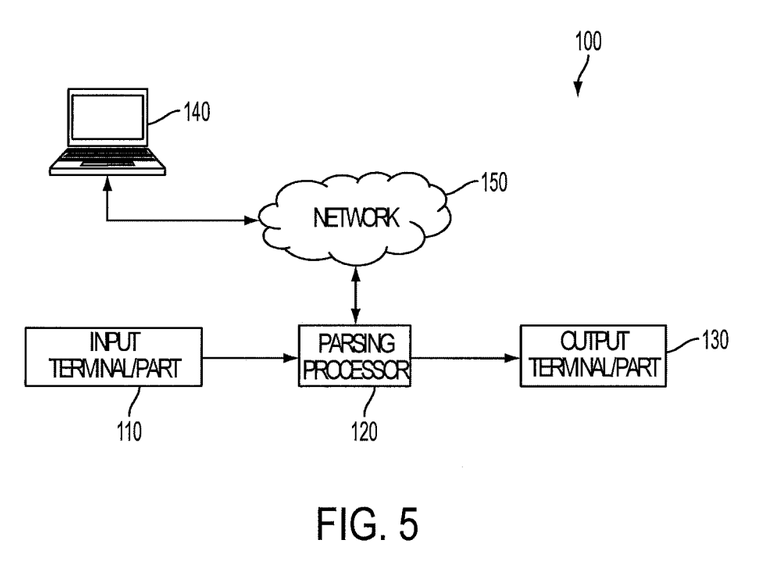
FIG. 5 is a diagrammatic illustration showing an exemplary apparatus and/or system suitable for practicing aspects of the present inventive subject matter.

With reference now to FIG. 5, there is shown a diagrammatic illustration of an exemplary apparatus and/or system 100 for parsing an input semi-structured document (e.g., such as the one shown in FIG. 1). As shown, the system 100 includes an input terminal and/or part 110 which captures, reads, receives and/or otherwise obtains the input document. For example, the input terminal or part 110 may include a scanner or the like which receives, reads and/or otherwise obtains an image of the document. Note that this input terminal may not be dedicated to the parsing system; rather, it may be a part of a larger document processing system and may share data with the parsing subsystem as well as with other systems.

The input terminal and/or part 110 in turn provides the image or other suitable representation of the semi-structured document to a parsing part and/or processor 120 that parses the input document. The resulting parse and/or other output from the parsing part and/or processor 120 is then provided, e.g., to an output terminal and/or part 130. Optionally, the output terminal and/or part 130 may include a display or monitor or printer or memory or data storage device or other like output device on which the resulting parse, parse structure and/or covering is selectively output and/or saved, e.g., either graphically or via some other suitable representation, be it electronic or otherwise. Suitably, the resulting output and/or parse (optionally, along with the document and/or contents thereof) may simply be saved using a suitable format in a data file or the like on a volatile or non-volatile memory or in another suitable data storage device (e.g., which uses electronic, magnetic, optical or other like data storage media). Optionally, the output may also be shown in human-readable format, such as using boxes or other graphical representation overlaid on the document image or other representation to denote the selected records and/or resulting parsed (e.g., as shown in FIG. 3).

In practice, the input document and/or image or other representation thereof may be received in the form of a data file or the like. Suitably, the received file may be received in and/or converted to one or more various formats, e.g., such as Tagged Image File Format (TIFF), Graphics Interchange Format (GIF) or other bitmap image format, Joint Photographic Experts Group (JPEG) format, Portable Document Format (PDF) or another suitable format for providing semi-structured document and/or its image. Optionally, the input file or data may be received by the parsing part and/or processor 120 from a computer, work station or other user terminal 140, e.g., over a suitable communications network 150. In turn, the parse and/or other output from the parsing part and/or processor 120 may be returned thereto, e.g., also via the network 150.

Figure 6:
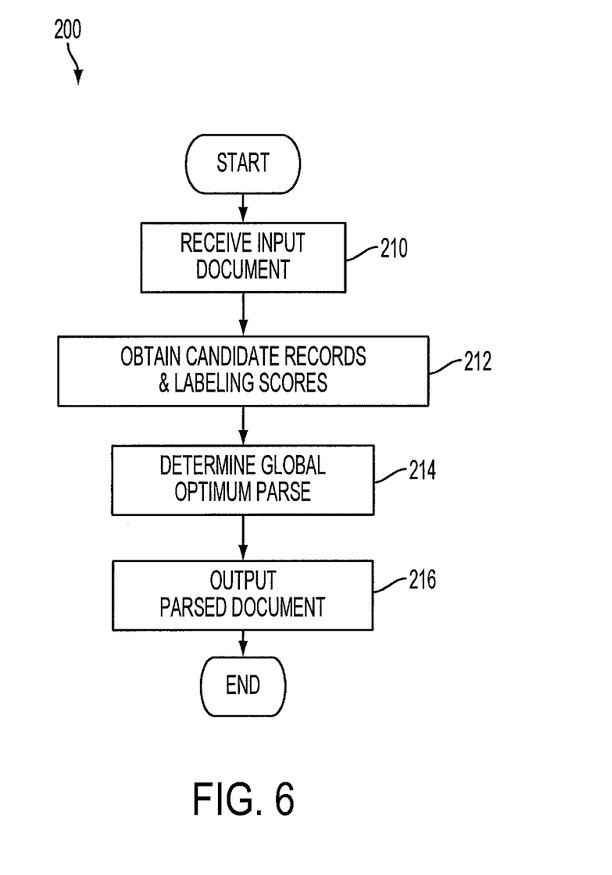
FIG. 6 is a flow chart showing an exemplary method and/or process for optimal parsing of a semi-structure document in accordance with aspects of the present inventive subject matter.

With reference now to FIG. 6, there is shown an exemplary method or process 200, e.g., carried out by the processor 120 of the system 100, by which an input semi-structured document is parsed.

As shown, at step 210 an input semi-structured document is received, e.g., from the input terminal or part 110 or from the user terminal 140 via the network 150.

At steps 212, a set of candidate records 20 are identified and/or determined for the input document 10 along with their labeling score, e.g., as taught by Bart and/or Pavlopoulou. Optionally, this step may be carried out by the processor 120 or by a separate processor.

At step 214, the set of candidate records 20 and their labeling scores are employed to derive, compute and/or otherwise determine the optimal parse or final solution for the document 10, e.g., via dynamic programming and/or as otherwise described above. For example, suitable, the processor 120 recursively computes and/or otherwise determines $T_n(i)$ for the candidate records 20 based on their labeling scores $S(i,j)$ as described above and/or determines the optimal global cost as $\min_n T_n(L)$. Suitably, to aid in the foregoing, the processor 120 may establish and/or generate the matrix shown in FIG. 4 and fill the same as described. Efficient tracing of the optimal solution upon termination of the procedure may be aided by optionally storing, for every $T_n(i)$ computed and/or determined, a pointer to the document line j where the previous grouping or record ends.

Finally, at step 216, the resulting parse it output. For example, the output may include a covering of the selected records over the document. In practice, the covering or parse structure may be graphically depicted in, represented or otherwise superimposed over the document 10 or an image or replication of the document 10, e.g., either in hardcopy or electronic or some other representative format. In other cases, the covering and/or parse structure may be represented and/or used in any of one or more ways depending on a specific embodiment or desired application, e.g., in one or more electronic data formats suitable for storing in a file or a database, exchanging over a network, and the like. Suitably, the text/tokens or other information or data included in the given records 22 may be extracted and/or provided with a meaningful label or semantic role or some other indicator or tag identifying the same, e.g., for use and/or storage in a database or spreadsheet or the like. Optionally, the output may also be shown in human-readable format, such as using boxes or other graphical representation overlaid on the document image or other representation to denote the selected records and/or resulting parsed (e.g., as shown in FIG. 3).

The above methods and/or apparatus have been described with respect to particular embodiments. It is to be appreciated, however, that certain modifications and/or alteration are also contemplated.

Notably, in various embodiments, the methods and/or system or apparatus disclosed herein has the ability to solve a wider range of problems than previously possible. Suitably, a single system can appropriately parse a broad range of semi-structured documents from several different categories (such as invoices, receipts, etc.). Previously, e.g., separate systems were typically used and/or specifically tuned for each different task or category.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, the parsing processor 120 may be embodied by a computer or other electronic data processing device that is configured and/or otherwise provisioned to perform one or more of the tasks, steps, processes, methods and/or functions described herein. For example, a computer or other electronic data processing device embodying the parsing processor 120 may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for parsing a semi-structured document having a plurality of document lines on which a series of items are listed, the listing of each item spanning one or more document lines, said method comprising:
    obtaining a plurality of candidate records, each candidate record spanning one or more lines of the document;
    defining a term representing an optimal cost of selecting a number n of candidate records to span the document lines up to a given ending document line i;
    efficiently evaluating the term over a first range of values for n and a second range of values for i;
    selecting a subset of the plurality of candidate records as a global optimal parse of the document, wherein the subset selected is based on the evaluation of the term;
    constraining the selection of the subset such that no two selected candidate records in the subset spans the same document line;
    establishing a matrix having a plurality of entries into which values for the evaluated terms are entered, said matrix being defined by a plurality of columns and a plurality of rows which intersect one another to define the entries; and
    employing the matrix to determine which of the plurality of candidate records are selected for the subset.

2. The method of claim 1, further comprising:
    computing a value for a matrix entry in an n-th row and an i-th column of the matrix by taking a minimum of those values which are entered in the entries defined by the row preceding the n-th row and the columns preceding the i-th column.

3. The method of claim 2, further comprising:
    finding a global optimal cost of the parse as a minimum of the values entered in the entries of a last column of the matrix.

4. A method for parsing a semi-structured document having a plurality of document lines on which a series of items are listed, the listing of each item spanning one or more document lines, said method comprising:
    obtaining a plurality of candidate records, each candidate record spanning one or more lines of the document;
    defining a term representing an optimal cost of selecting a number n of candidate records to span the document lines up to a given ending document line i,
    wherein the defined term $T_n(i)$ is given by $$T_n(i) = \min_{j<i}(T_{n-1}(j) + S(j,i)) \text{ for all } i \leq L$$

where L is a total number of lines in the document and $S(i,j)$ is a labeling score associated with labeling document lines i through j with candidate records contained therebetween;
    efficiently evaluating the term over a first range of values for n and a second range of values for i; and
    selecting a subset of the plurality of candidate records as a global optimal parse of the document, wherein the subset selected is based on the evaluation of the term.

5. The method of claim 4, wherein the subset of candidate records is selected when a global optimal cost of the parse is given by $\min_n T_n(L)$.

6. A system for parsing a semi-structured document having a plurality of document lines on which a series of items are listed, the listing of each item spanning one or more document lines, said system comprising:
    a processor operative to:
        obtain a plurality of candidate records, each candidate record spanning one or more lines of the document;
        define a term representing an optimal cost of selecting a number n of candidate records to span the document lines up to a given ending document line i;
        efficiently evaluate the term over a first range of values for n and a second range of values for i;
        select a subset of the plurality of candidate records as a global optimal parse of the document, wherein the subset selected is based on the evaluation of the term;
        constrain the selection of the subset such that no two selected candidate records in the subset spans the same document line;
        establish a matrix having a plurality of entries into which values for the evaluated terms are entered, said matrix being defined by a plurality of columns and a plurality of rows which intersect one another to define the entries; and
        employ the matrix to determine which of the plurality of candidate records are selected for the subset.

7. The system of claim 6, wherein said processor is further operative to:

compute a value for a matrix entry in an n-th row and an i-th column of the matrix by taking a minimum of those values which are entered in the entries defined by the row preceding the n-th row and the columns preceding the i-th column.

8. The system of claim 7, wherein said processor is further operative to:

find a global optimal cost of the parse as a minimum of the values entered in the entries of a last column of the matrix.

9. A system for parsing a semi-structured document having a plurality of document lines on which a series of items are listed, the listing of each item spanning one or more document lines, said system comprising:

a processor operative to:

obtain a plurality of candidate records, each candidate record spanning one or more lines of the document;

define a term representing an optimal cost of selecting a number n of candidate records to span the document lines up to a given ending document line i, wherein the defined term $T_n(i)$ is given by $$T_n(i) = \min_{j<i}(T_{n-1}(j) + S(j,i)) \text{ for all } i \leq L$$

where L is a total number of lines in the document and $S(i,j)$ is a labeling score associated with labeling document lines i through j with candidate records contained therebetween;

efficiently evaluate the term over a first range of values for n and a second range of values for i; and select a subset of the plurality of candidate records as a global optimal parse of the document, wherein the subset selected is based on the evaluation of the term.

10. The system of claim 9, wherein the subset of candidate records is selected when a global optimal cost of the parse is given by $\min_n T_n(L)$.

11. The method of claim 1, wherein at least one of the obtained plurality of candidate records spans at least two lines of the document.

12. The system of claim 6, wherein at least one of the obtained plurality of candidate records spans at least two lines of the document.

* * * * *